UNITED STATES PATENT OFFICE.

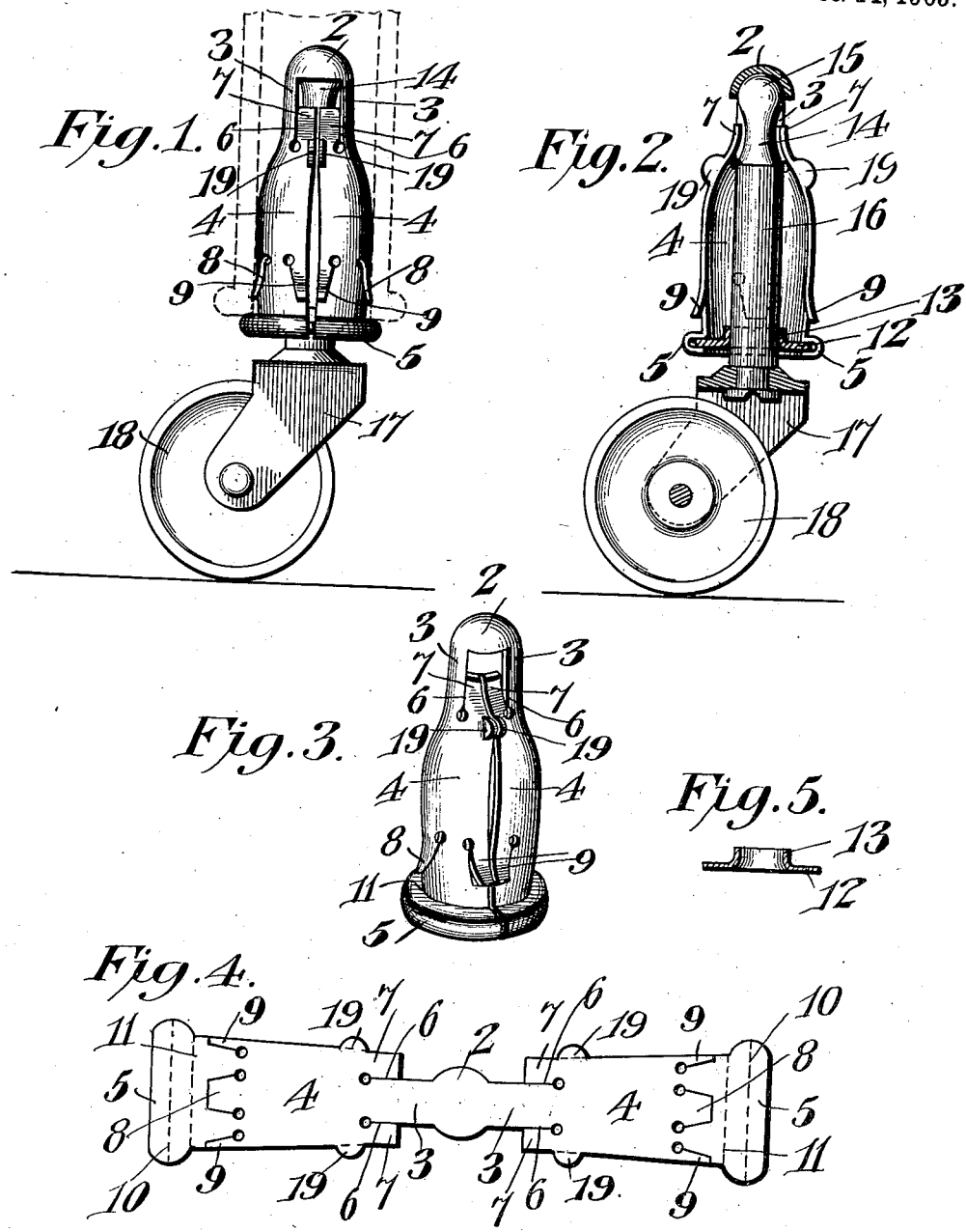

DUNCAN A. MACCUAIG, OF NEBRASKA CITY, NEBRASKA.

CASTER-RETAINING SOCKET.

943,432.  Specification of Letters Patent. Patented Dec. 14, 1909.

Application filed May 24, 1909. Serial No. 497,995.

*To all whom it may concern:*

Be it known that I, DUNCAN A. MAC-CUAIG, a citizen of the United States, residing at Nebraska City, in the county of Otoe and State of Nebraska, have invented a new and useful Caster-Retaining Socket, of which the following is a specification.

My invention relates to sockets adapted to be inserted into the legs of articles of furniture and to retain the pintles of casters, the object of my invention being to provide a retainer socket made of a single piece of sheet steel, or other metal, bent up to form the sides of the socket, these sides being so constructed as to provide tongues adapted to engage respectively with the head of the usual caster pintle and with the interior bore of a furniture leg.

Another object of my invention is to provide a retaining socket of this character which may be driven into place and will tightly grip and expand against the inside face of the leg, thus holding the pintle firmly in place but permitting the pintle to be withdrawn or inserted when desired.

Still another object is to so construct the retainer that the upper end thereof shall be smaller than the lower and thus that the spring tongues which engage the head of the caster pintle shall be protected from harm and shall be held away from the interior face of the leg to which the retainer is applied. In addition, I design to provide a pintle centering ring or washer supported in the lower end of the retainer and so constructed as to prevent wear on the pintle.

A retainer constructed in accordance with these objects may be cheaply produced, has an arrangement of pintle retaining springs so disposed that they do not interfere with the introduction of the pintle into the socket and will not be thus interfered with or damaged, and a retainer which is capable when driven into place of holding solidly within the bore or central tube of a metal furniture leg, and which provides for a perfect centering of the pintle while permitting of its free rotation, and, to a large extent, preventing wear thereon.

This invention is an improvement on the construction described in my pending application, No. 460,481, filed October 31, 1908, wherein a cylindrical socket is shown of uniform diameter from one end to the other, adapted to be inserted in a recess of uniform size and clamping within the recess simply by the expansive force of the opposed sections or sides of the blank. This retainer is held in place by frictional contact between the walls of the socket and the walls of the recess, while my present retainer is designed to be held in place by tongues outwardly projecting from the socket and is therefore adapted to engage with metal furniture legs or posts. My present socket is also adapted to be driven into place and to be thereby compressed so that when driven home it is held firmly within the leg and is not likely to be withdrawn.

In the drawings, Figure 1 is a side elevation of my retainer as applied upon a pintle, the furniture leg being shown in dotted lines; Fig. 2 is a longitudinal sectional view through the same; Fig. 3 is a perspective view of the socket detached from the pintle; Fig. 4 is a plan view of the blank from which the retainer socket is made; and Fig. 5 is a transverse section of the centering washer.

The retainer socket is formed from a blank of sheet metal, preferably steel, such as is shown in Fig. 4. This blank has the central circular cap disk 2, the connection portions 3—3, and the two side plates 4—4, having edges outwardly inclined to each other, and terminating with laterally enlarged portions 5—5. Slits 6, extending inwardly from the inner ends of the sides 4 parallel with the edges of the sides form square-ended tongues, 7, two to each side piece 4. Resilient tongues, 8 and 9, are also punched out of the metal of the sides just above the enlarged portion 5, these tongues projecting in an opposite direction to the tongues 7, and the tongues 9 being formed at the margins of the sides. The blank is described as doubled over upon itself as shown in Figs. 1 to 3. The circular disk 2 is formed into a concaved cap adapted to fit over the rounded or ball-like upper end of a pintle. The connecting portions 3—3 and the sides 4—4 are transversely curved so that when the blank is doubled over as above referred to the socket will be practically cylindrical in section and the sides 4 will each be approximately semi-cylindrical. It will be seen from the figures that thus made the socket has a contracted upper end which gradually swells outward to a larger diameter and that these sides are slightly contracted toward their lower ends so that the lower end of the socket just above the flange 5 is slightly smaller than the socket just above it, and that the upper end of the cylinder is very greatly contracted so that the tongues 7 are entirely withdrawn from any possible contact with the inside of the furniture leg and are thereby protected from contact with the leg either in entering the socket into its place, or when in place. The enlarged portion 5 of the blank is bent on lines 10, 11, to form an annular recessed ring, as shown in Fig. 2 to receive the margin of an annular pintle-centering plate 12, having a flange 13 forming a tubular bearing member for the pintle. The spring tongues 7 are bent inwardly to engage with the contracted neck, 14, beneath the usual rounded head 15, of a pintle 16, while the spring tongues 8 and 9 are bent outward to engage the inside surface of a tubular leg as shown in dotted lines. In cutting the end of metal pipes or tubes used for making these tubular legs, a bur is very likely to be left which projects inward. These spring tongues 8 and 9 are particularly effective when used in metal pipe having a bur of this character, as the tongues spring outward after passing the bur and engage therewith so that the socket is held very solidly. The pintle 16 is, of course, attached to the usual yoke 17, and caster wheel, 18, of any ordinary construction. Lugs 19 are formed on the side edges of the side pieces 4, as shown in Fig. 4 about in line with the ends of the slits 6. These lugs are bent outwardly at right-angles to the plates 4 as shown in Fig. 1, and when the socket is bent into its final shape, as in Fig. 3, it will be seen that these lugs 19 will abut one against the other. These lugs not only act to strengthen the socket at this point, but also act to prevent one plate 4 from being forced over and past the edge of the other plate 4. In other words, prevent the plates from overlapping under compression, and they are located above the largest portion of the socket so as to increase the rigidity of the socket at this point against compressing strains. It will also be seen that the lower end of the plates 4 is reinforced by the annular flange 5 and that the flanges on the two plates 4, 4, meet, thereby preventing the lowest end of the socket from being too greatly compressed and the plates from overlapping upon each other.

It will be seen from Fig. 1 that the middle portions of the edges of the plates 4 do not contact with each other; but that even when the lugs 19 are in contact with each other and the two flanges 5, 5, abut against each other, yet the edges of the central portions of the plates will be slightly separated. This allows the bulging portion of the socket to be compressed as the socket is driven into place and permits the plates to come nearer to each other at the edges. I thus secure not only the resilience due to the natural spring of the metal which acts to force the two side plates 4, 4, apart from each other, but I secure a further spring action due to the socket being bulged along its middle portion and this bulging portion having to be somewhat slightly compressed as the socket is driven into place. In addition to this, and still further preventing the detachment of the socket, I provide the tongues 8 and 9, previously referred to.

The spring tongues 7 project inward just sufficiently to make a good engagement with the under side of the head 15 and prevent the accidental detachment of the pivot, but the tongues yield sufficiently to permit the pivot to be easily withdrawn when desired or to be as easily inserted.

In Fig. 5 I show a section of the centering plate or washer 12. It is to be noted that the flange 13 of this plate is drawn up and that the junction between the inner face of the flange and the face of the plate is rounded, and, therefore, that no sharp edges are presented to the pintle which would scratch or wear the same. This is an important feature in that in operation the pintle is pressed in one direction or the other against the washer and therefore is subjected to considerable wear unless some means be taken to round off the edge. With my washer it will be seen that there is no edge engagement with the pintle at all. It will be noted in this connection that the upper end of the pintle is centered by the springs 7, these springs having a broad bearing against the neck 14. Inasmuch as the springs do not extend up to the head 15 and as said head is held in its uppermost position by the natural pressure against the bottom of the caster, the springs will not wear against the head.

From the foregoing, it is thought that the construction, operation and many advantages of the herein described invention will be apparent to those skilled in the art without further description, and it will be understood that various changes in the size, shape, proportions and the minor details of construction may be resorted to without departing from the spirit or sacrificing any of the advantages of this invention.

Having thus described my invention, what I claim as new and desire to secure by Letters Patent, is:

1. A caster retaining socket comprising an approximately hollow hemispherical cap, a tubular body diametrically split into two sections, the edges of which are disposed in meeting relation, connecting members integrally connected with the cap and sections of the body, and inwardly-bent spring pintle-engaging lugs disposed along the members toward the cap with their free ends spaced from the latter, the lugs being arranged contiguous with the edges of the body sections and integrally connected therewith.

2. A caster retaining socket comprising an approximately hollow hemispherical cap, a tubular body diametrically split into two sections, the edges of which are disposed in meeting relation, connecting members integrally connected with the cap and sections of the body, inwardly-bent spring pintle-engaging lugs disposed along the members toward the cap with their free ends spaced from the latter, the lugs being arranged contiguous with the edges of the body sections and integrally connected therewith, and outwardly-bent spring anchoring lugs on the body sections extending in the opposite direction from the pintle-engaging lugs and located along the edges of the said sections.

3. A caster retaining socket comprising an approximately hollow hemispherical cap, a tubular body diametrically split into two sections, the edges of which are disposed in meeting relation, connecting members integrally connected with the cap and sections of the body, inwardly-bent spring pintle-engaging lugs disposed along the members toward the cap with their free ends spaced from the latter, the lugs being arranged contiguous with the edges of the body sections and integrally connected therewith, outwardly-bent spring anchoring lugs on the body sections extending in the opposite direction from the pintle-engaging lugs and located along the edges of the said sections, and laterally projecting non-resilient lugs formed on the body sections at the edges thereof at points between both-mentioned lugs.

4. A caster retaining socket comprising an approximately hollow hemispherical cap, a tubular body diametrically split into two sections, the edges of which are disposed in meeting relation, connecting members integrally connected with the cap and sections of the body, inwardly-bent spring pintle-engaging lugs disposed along the members toward the cap with their free ends spaced from the latter, the lugs being arranged contiguous with the edges of the body sections and integrally connected therewith, outwardly-bent spring anchoring lugs on the body sections extending in the opposite direction from the pintle-engaging lugs and located along the edges of the said sections, an annular flange at the larger end of the socket provided with an annular seat, and a pintle-centering member engaging in the seat and of less diameter than the latter whereby the body sections can be compressed toward each other.

5. A retaining socket made of a sheet metal blank doubled into opposing transversely curved sections that form, when together, a tubular socket, said socket being of relatively smaller diameter at its upper end and of relatively larger diameter below the upper end, the edges of said sections contacting above and below the enlarged portion of the socket, and outwardly projecting portions on the two members adapted to contact with each other, said portions being located at the points where the opposed sections contact with each other, said edges having incisions to provide outstanding anchoring lugs.

6. A retaining socket made of a sheet metal blank doubled into opposing transversely curved sections that form, when together, a tubular socket, said socket being of relatively smaller diameter at its upper end and of relatively larger diameter below the upper end, the edges of said sections contacting above and below the enlarged portion of the socket, the sections at the upper contacting point being provided with outwardly projecting lugs adapted to abut against each other and said sections at their lower end being provided with outwardly projecting flanges, the ends of which are adapted to abut against each other, and oppositely-extending inwardly and outwardly bent spring pintle-engaging and anchoring lugs formed respectively adjacent the upper and lower ends of the socket contiguous with the edges of the said sections.

7. A caster retaining socket substantially tubular in section, having a longitudinal slit, a plurality of outwardly projecting resilient tongues at the edges of the slit adapted to engage the wall of the recess into which the socket is placed.

8. The combination of a socket split longitudinally to form resilient members, said socket having a hollow bead-like flange at its open end to form an annular seat, a washer arranged in the seat of less diameter than the seat for permitting the members of the socket to spring toward each other when placing the socket in position, said members having resilient anchoring lugs adjacent the flange, the resiliency of the lugs and the members coöperating to firmly anchor the socket in place, and a pintle passing through the washer and rotatably mounted in the socket.

9. A caster retaining socket substantially tubular in section having a plurality of pintle-retaining reslient tongues projecting inwaard therefrom and extending toward the closed end of the socket, and a plurality of outwardly projecting reslient tongues extending toward the open end of the socket adapted to engage with a recess into which the socketm ayb eforc ed.

10. A caster retaining socket substantially tubular in section having a contracted upper end and a gradually expanded portion below the lower end, diametrically opposite pairs of resilient tongues struck out of the metal of the socket, inwardly projecting and located at the junction of the enlarged body portion with the contracted upper end, the tongues of each pair being independent of each other.

11. A caster retaining socket substantially tubular in section having a contracted upper end and a gradually expanded portion below the lower end, diametrically opposite pairs of upwardly-extending resilient tongues struck out of the metal of the socket, inwardly projecting and located at the junction of the enlarged body portion of the contracted upper end, and means on the lower end of the socket for centering the pintle of a caster.

12. A caster retaining socket substantially tubular in section having a contracted upper end and an enlarged lower end adapted to be applied over the pintle of a caster, tongues formed in the metal of the socket at its contracted upper end and projecting inward to engage the head of a caster pintle, resilient tongues formed in the metal of the socket at the lower end thereof, projecting outwardly and adapted to engage the wall of a recess into which the socket may be forced, and a centering washer attached to the lower end of the socket through which the pintle may be passed.

13. The combination with a caster having a cylindrical pintle provided at its end with a contracted neck and a rounded head, of a retaining socket therefor, comprising a substantially tubular enlarged body portion, a contracted neck and a concaved cap, the neck being provided with inwardly projecting resilient tongues extending toward the cap from the body portion adapted to engage below the rounded head of the pintle, the lower end of the socket being formed with means to center the pintle and provided with means for holding the socket in place when inserted into the recess.

14. The combination with a caster having a cylindrical pintle, a contracted neck and a rounded head on the upper end of the pintle, of a retaining socket therefor having a tubular body provided with oppositely disposed pairs of members for resiliently engaging the head of the pintle, said members being located wholly below the head and extending upwardly from the said body, means for centering the body of the pintle, means for resiliently resisting the compression of the socket, and means for preventing the withdrawal of the socket after its insertion.

15. A caster retaining socket formed of a sheet metal blank doubled into opposing transversely curved sections that form between them a substantially cylindrical socket, opposed pintle retaining springs cut from the margins of the sections, said springs extending inwardly into the socket, and a plurality of outwardly projecting spring tongues cut from the material of the sections and extending outwardly and downwardly.

16. A caster retaining socket formed of a sheet metal blank doubled into opposing transversely curved side plates, connected by a middle pintle cap portion, the middle portion of said blank being narrow and gradually widening to form said side plates, a plurality of pintle engaging spring tongues cut from the margins of both plates at the upper end thereof, said tongues extending inwardly into the socket, and opposed lugs formed on the margins of the plates at the base of said spring tongues, said lugs being outwardly turned and adapted to abut one against the other.

17. A caster retaining socket substantially tubular in section having a contracted upper end adapted to engage the pintle of a caster, and an enlarged lower portion larger in diameter than the said pintle, said lower portion being outwardly and then inwardly bent to form an annular recessed flange, and an annular washer carried in said flange and formed with an inwardly-extending tubular bearing member through which the shank of the pintle is adapted to be passed, said washer being of such diameter as to allow the lower portion of the socket to contract on the washer in placing the socket in the recessed member into which the socket is forced.

In testimony, that I claim the foregoing as my own, I have hereto affixed my signature in the presence of two witnesses.

DUNCAN A. MACCUAIG.

Witnesses:
 PAUL JESSEN,
 A. M. MUNN.